United States Patent [19]

Naya et al.

[11] Patent Number: 4,725,714
[45] Date of Patent: Feb. 16, 1988

[54] DRIP-TYPE HOT WATER FEEDER

[75] Inventors: Masaru Naya, Tama; Shinichi Takahashi, Yachiyo; Masayuki Kuzumaki, Machida, all of Japan

[73] Assignees: Kabushiki Kaisha Toshiba, Kawasaki; Kanazawa Industries Co., Ltd., Sashima; Koyusha Co., Ltd., Tokyo, all of Japan

[21] Appl. No.: 849,864

[22] Filed: Apr. 9, 1986

[30] Foreign Application Priority Data

Apr. 9, 1985 [JP] Japan .............................. 60-52457[U]

[51] Int. Cl.⁴ .................. H05B 1/02; A47J 31/00; G04B 47/02
[52] U.S. Cl. .................... 219/308; 99/281; 99/282; 99/288; 99/307; 219/327; 219/334; 219/493; 368/10; 368/228; 368/231; 368/232
[58] Field of Search ............. 219/308, 327, 334, 492, 219/493; 99/281, 282, 306–312, 288; 368/10, 228, 231, 232

[56] References Cited

U.S. PATENT DOCUMENTS 2,723,335  11/1955  Hotchkin ........................ 99/281
3,602,129  8/1971  Cherre ............................ 99/312

FOREIGN PATENT DOCUMENTS 53-144783  4/1977  Japan .

Primary Examiner—Anthony Bartis
Attorney, Agent, or Firm—Oblon, Fisher, Spivak, McClelland & Maier

[57] ABSTRACT

A drip-type hot water feeder of a coffee maker incudes an electric heater for heating and boiling water fed from a water reservoir, and a timer for controlling the time for supplying an electric current to the heater to regulate the hot-water supply to a brewer. The timer has a manually movable control member for continuously variably setting the current supply time and a scale indicating the quantity of hot-water supply corresponding to the time set by the control member. Each mark of the scale has a predetermined width in the setting movement direction of the control member and includes a plurality of compensating indexes indicative of the adjustment of the control member necessary to compensate the set current supply time and thus the quantity of hot water to be supplied indicated by each mark for variations in cold water conditions influencing the time required for supplying a desired quantity of a hot water. The compensating indexes for each mark include a high-temperature index standard index and low-temperature index arranged successively in the direction of setting movement.

7 Claims, 4 Drawing Figures

DRIP-TYPE HOT WATER FEEDER

BACKGROUND OF THE INVENTION

The present invention relates to a drip-type hot water feeder, and more specifically to a drip-type hot water feeder with a timer.

A conventional hot water feeder of this type is disclosed in Japanese Patent Disclosure No. 144783/78. In a coffee maker with this feeder, coffee is brewed in the following manner. First, water in a water reservoir is fed into a heating pipe, and is heated and boiled by heater. The resulting hot water is dripped into a brewer containing ground coffee. The electric current supply to the heater is controlled by a timer. The timer is set any desired quantity of hot-water supply. More specifically, if the dial of the timer is turned to scale mark, e.g., number "4" indicative of four cups of coffee, the heater is kept energized until four cups of water boils, whereby coffee for four cups is brewed.

In the prior art coffee maker of this type, however, the quantity of hot water actually obtained may vary with temperature conditions, such as water temperature, ambient temperature, etc., although the set time of the timer is fixed. If the water temperature or ambient temperature varies, the time for boiling water also vary. If the temperature is low, the quantity of actually boiled water will be smaller than a desired one even though the timer is set to the predetermined scale mark. Thus, sufficient coffee cannot be brewed.

SUMMARY OF THE INVENTION

Accordingly, the object of the invention is to provide a drip-type hot water feeder capable of feeding a desired quantity of hot water despite the change of water temperature, ambient temperature, etc.

In order to achieve the above object, a hot water feeder according to the present invention is provided with a timer for controlling the conduction time of a heater and a scale indicating the set time of the timer. Marks of the scale are spaced from one another and each have a predetermined width. Each mark includes a plurality of compensating indexes corresponding to variable temperature conditions influencing the time for boiling water, such as cold water temperature, ambient temperature, etc.

The hot water feeder of the invention can feed a desired quantity of hot water into a coffee brewer, by first setting the timer to a desired mark of the scale, and then more finely adjusting it to that compensating index of the mark which meets the temperature conditions.

BRIEF DESCRIPTION OF THE DRAWINGS

FIGS. 1 through 3 show a coffee maker with a hot water feeder according to an embodiment of the present invention, in which FIG. 1 is a perspective view of the coffee maker, FIG. 2 is a sectional view of the coffee maker, and FIG. 3 is an enlarged plan view of a scale of a timer.

DETAILED DESCRIPTION OF THE PREFERRED EMBODIMENT

An embodiment of the present invention will now be described in detail with reference to the accompanying drawings.

Figure 1:
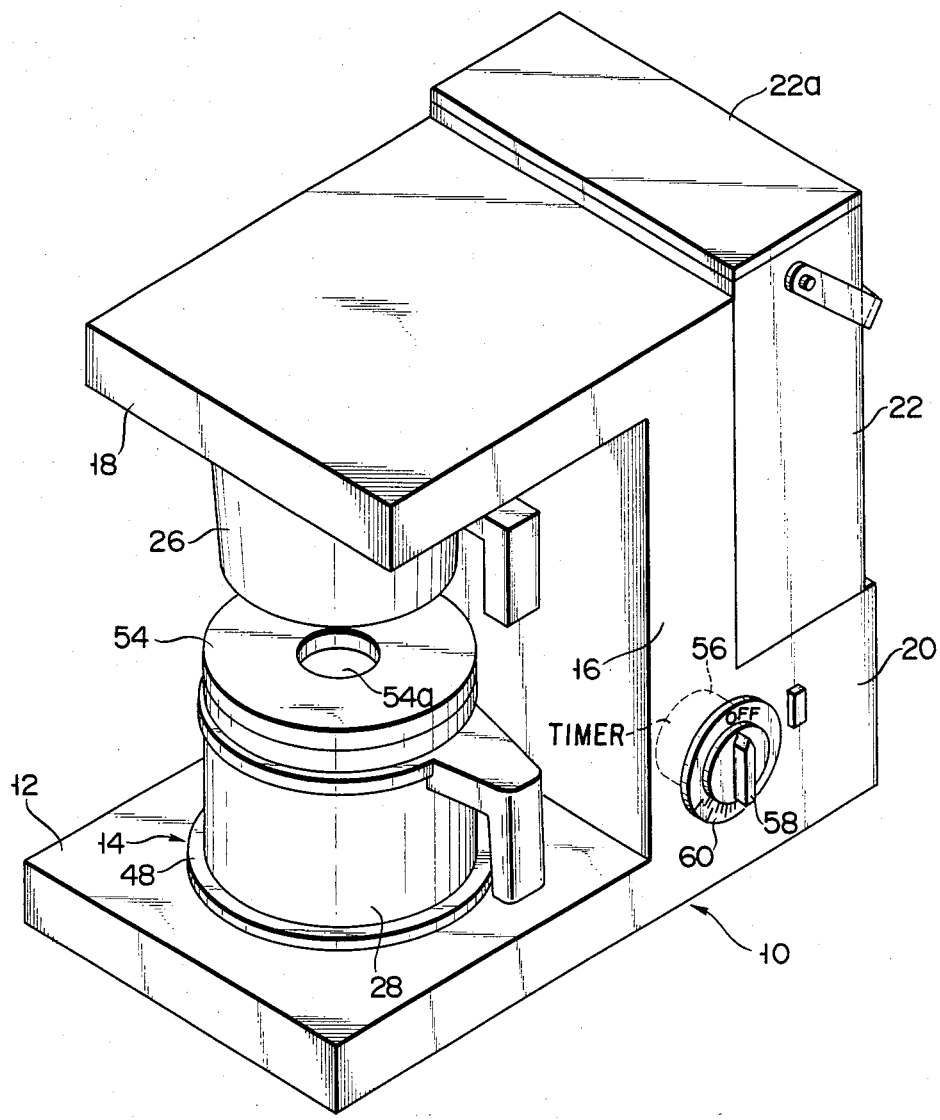
Figure 2:
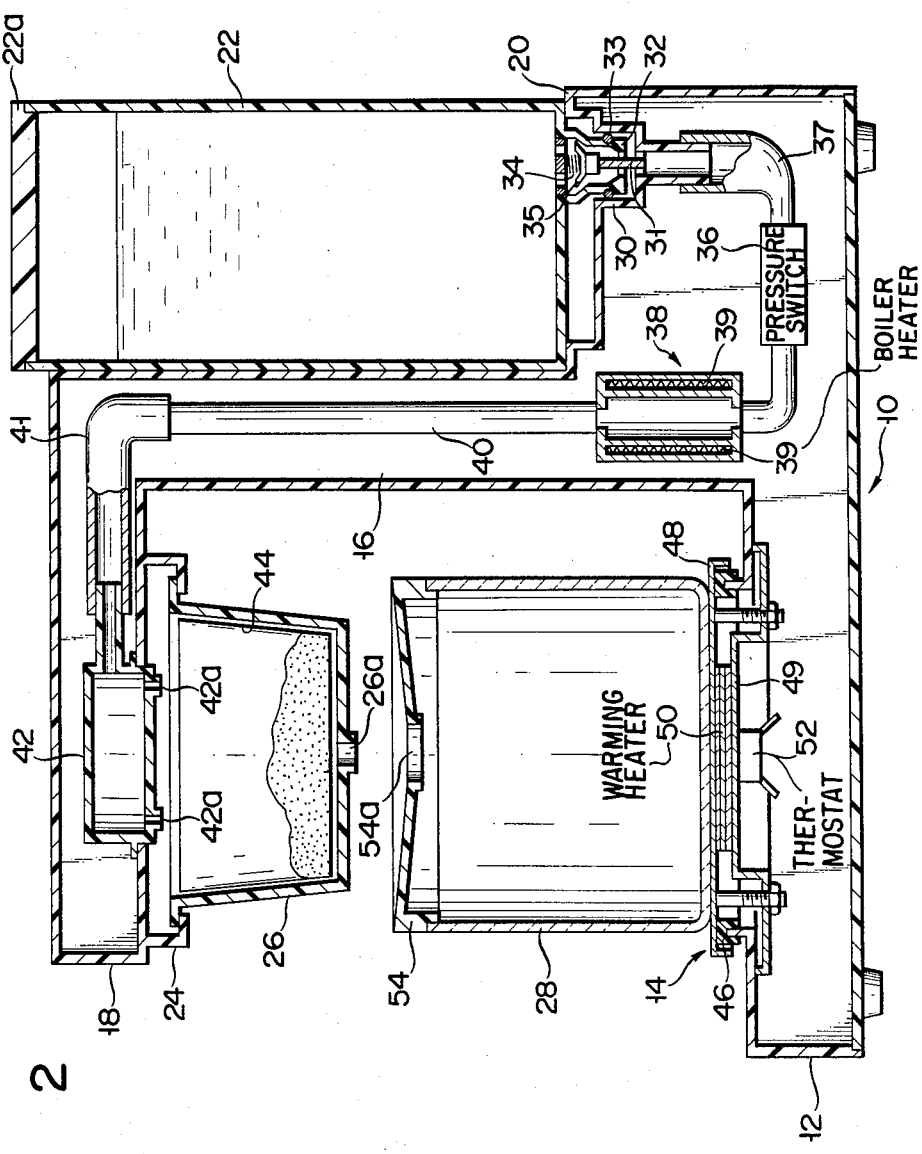

Referring now to FIGS. 1 and 2, there is shown a coffee maker with a hot water feeder according to the embodiment of the invention. The maker comprises body 10 which includes base 12 formed with jug stand 14, upright portion 16 protruding substantially vertically from base 12, and support portion 18 extending parallel to base 12 from the top end of portion 16. Water reservoir mounting portion 20 is formed at the side of upright portion 16, and water reservoir 22 having lid 22a is detachably mounted on portion 20. Support portion 18 is formed with brewer mounting portion 24 to which brewer or filter basket 26 is removably attached. Stand 14 carries thereon jug 28 which receives brewed coffee from basket 26.

Mounting portion 20 is formed with water inlet socket 30, and push rod 31 protrudes upward from the center of socket 30. Water reservoir 22 has a relatively large capacity, accommodating some 20 cups of water. From the bottom of reservoir 22 protrudes water inlet portion 32 which is inserted in socket 30. Ring-shaped seal member 33 is fitted on the outer peripheral surface of portion 32, whereby socket 30 is engaged with portion 32 in a liquid-tight manner. Inlet portion 32 contains normally-closed valve 35 which is urged to close by spring 34. When reservoir 22 is mounted on mounting portion 20, valve 35 is pushed up by rod 31 to open.

Water inlet socket 30 is connected with water-pressure switch 36 within base 12 by means of coupling tube 37. Switch 36 is connected successively with boiler 38 having heater 39 therein and heating pipe 40. Pipe 40, which is formed of metal, extends through upright portion 16 to support portion 18. The extended end of pipe 40 is connected to hot-water supply nozzle 42 through coupling tube 41. Member 42 is located above brewer mounting portion 24, and has a plurality of hot-water supply ports 42a which open to filter basket 26 attached to portion 24. Switch 36 is connected in series with a timer (mentioned later). Switch 36 is designed so as to close a heater driver circuit (not shown) by the pressure of water if the water is present in water reservoir 22, and to open the driver circuit if reservoir 22 is exhausted. Extraction port 26a is formed in the bottom wall of basket 26, opening to jug 28. Paper filter 44 is put in basket 26, and ground coffee is placed on the filter.

Jug stand 14 includes hot plate 48 which is mounted on base 12 by means of waterproof gasket 46. Heater holding plate 49 is arranged below plate 48 to separately face the same. Sandwiched between plates 48 and 49 is warming heater 50 having an insulating plate on each side. Thermostat 52 is fixed to the undersurface of plate 49.

Lid 54 is attached to the opening of jug 28 which rests on jug stand 14. It has aperture 54a which is coaxial with extraction port 26a of filter basket 26.

Body 10 is fitted with timer 56 which is connected to the driver circuit of heater 39 to control the conduction time of heater 39. Timer 56 is provided with dial 58 which is rotatably mounted on a lateral face of body 10. Once dial 58 is rotated from its initial position, timer 56, like a conventional one, allows heater 39 to be energized until the dial is restored to the initial position by urging means. In this embodiment, if dial 58 is rotated farther in the clockwise direction, then the set time for the energization of heater 39 is lengthened in proportion. Scale 60 is formed on the lateral face of body 10, surrounding dial 58. It indicates the quantity of hot-water supply corresponding to the set time of timer 56. Since dial 58 is of a rotary-type in this embodiment, scale 60 is ring-shaped and coaxial with the rotational center of the dial.

Figure 3:
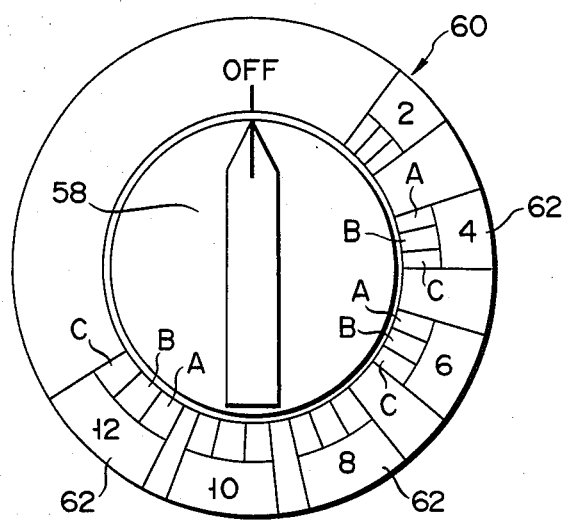

As shown in FIG. 3, scale 60 has a plurality of marks 62 spaced circumferentially from one another and from point OFF which is indicative of a nonconducting state of heater 39. Having a predetermined width in the circumferential direction of scale 60, each mark 62 bears the number of cups indicative of the quantity of hot-water supply corresponding to the set time of timer 56 or the rotational angle of control dial 58. The cup number on each mark 62 increases with clockwise distance from point OFF. Moreover, each mark 62 includes three compensating indexes A, B and C for compensating the variation of hot-water supply depending on the change of temperature conditions such as water temperature. Indexes A, B and C are successively arranged clockwise along the circumference of dial 58, having the same width trisecting the circumferential width of mark 62. Central index B is a standard compensating index which is used when the water temperature ranges, for example, from 19° to 22° C. Index A is a high-temperature for a relatively high water temperature from 23° to 25° C., while index C is a low-temperature index for a relatively low water temperature from 15° to 18° C. If dial 58 is turned to index A or C, the heater conduction time is set to a shorter or longer time than in the case where the dial is adjusted to standard index B. To improve the operating efficiency of the coffee maker, indexes A, B and C may be classified by color or marked with, e.g., characters H (high), M (middle) and L (low), respectively.

Using the coffee maker constructed in this manner, coffee is brewed in the following processes.

First, water reservoir 22, containing water greater enough in quantity than the coffee to be brewed, is mounted on mounting portion 20 of body 10. The water in reservoir 22 is fed into boiler 38 and heating pipe 40 via water inlet portion 32 and water-pressure switch 36. Switch 36 is closed by the water from reservoir 22 to allow heater 39 to be energized. Filter basket 26, containing paper filter 44 and ground coffee, is attached to mounting portion 24 of body 10, and jug 28 is placed on jug stand 14.

Subsequently, timer 56 is set by adjusting control dial 58 to that mark 62 which bears the numeral indicative of the number of cups corresponding to the desired quantity of coffee or equivalent to the number of coffee drinkers. As a result, heater 39 in boiler 38 is energized, and the water in boiler 38 and heating pipe 40 is heated by heater 39. When the water in boiler 38 and pipe 40 boils, resulting hot water is caused to flow from pipe 40 into hot-water supply nozzle 42 through coupling tube 41 by a pressure produced by the boiling, and then drops onto the ground coffee in filter basket 26 through supply ports 42a. Coffee brewed in basket 26 drops into jug 28 through ports 26a and aperture 54a.

When hot-water is fed from heating pipe 40 into filter basket 26, the pressure inside pipe 40 and boiler 38 lowers, and water is supplied afresh from water reservoir 22 to boiler 38 and pipe 40. The water is heated into hot water by heater 39 and fed into basket 26 in the same manner as aforesaid. The feed of hot water based on this heat-pump action is repeated until heater 39 is deenergized. The coffee collected in jug 28 is kept warm by heat from warming heater 50.

The conduction time of heater 39 of boiler 38 is set by means of timer 56 in consideration of the cold water temperature, ambient temperature and other temperature conditions. In brewing coffee for eight cups, for example, control dial 58 is adjusted to mark "8" of scale 60. If the temperature conditions, including the cold water and ambient temperatures, are standard or normal, dial 58 is more specifically adjusted to compensating index B of the mark. If the water or ambient temperature is low, as in winter or in a cold district, dial 58 is adjusted to index C of the mark. If the temperature is high, as in summer or in a hot district, dial 58 is adjusted to index A.

If the water or ambient temperature is low, the time required for boiling the water in boiler 38 and heating pipe 40 is relatively long. Accordingly, the boiling frequency and hence the rate of hot-water feed should be lowered. If control dial 58 is then adjusted to low-temperature index C, however, the conduction time of heater 39 set by timer 56 is made longer than in the case where dial 58 is adjusted to standard index B. Thus, the hot-water feed rate is prevented from lowering. If the temperature is high, on the other hand, the necessary time for the boiling is relatively short, so that the boiling frequency and feed rate should increase. By adjusting dial 58 to high-temperature index A, however, the heater conduction time can be made shorter than in the standard case. In consequence, the boiling frequency can be reduced to prevent the increase of the feed rate.

According to the coffee maker of the construction described above, the set time of timer 56 can be selected in accordance with the temperature conditions, such as cold water and ambient temperatures, by the use of the compensating indexes. Thus, a quantity of coffee corresponding to the desired number of cups can stably be brewed without being influenced by the change of the temperature conditions.

Figure 4:
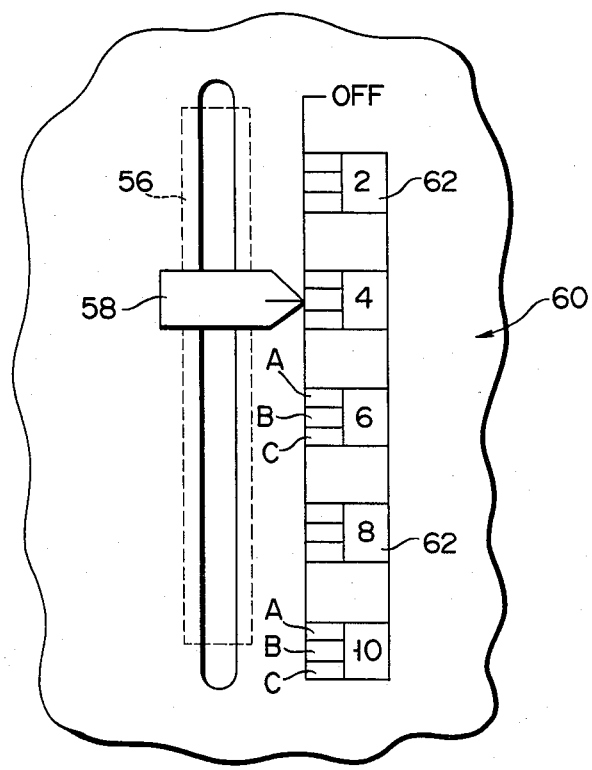
FIG. 4 is a front view showing a modification of the timer.

It is to be understood that the present invention is not limited to the embodiment described above, and that various changes and modifications may be effected therein by one skilled in the art without departing from the scope or spirit of the invention. In the above embodiment, for example, water reservoir 22 is formed separately from body 10. Alternatively, however, it may be formed integrally with the body. Moreover, the number of compensating indexes in each mark, as well as the shape and configuration of the marks and indexes, may be changed as required. Furthermore, dial 58 can be replaced by slider 58 shown in FIG. 4. In this case, scale 60 extends in a straight line parallel to the moving direction of dial 58.

Further, the hot-water feeder of the invention is applicable to making not only coffee but also to tea.

What is claimed is:

1. In a drip-type coffee maker including a water feeder for feeding hot water to a brewer, the improvement wherein said hot water feeder comprises:
a water reservoir containing water;
water guide means for guiding the water from the water reservoir into the coffee brewer;
electric water heating means between said water reservoir and said guide means for heating and boiling the water fed from the water reservoir to the guide means, resultant hot water being supplied through the guide means to the brewer by a pressure produced by the boiling; and a timer in circuit with said heating means for controlling the time for supplying an electric current to the heating means to regulate the hot-water supply to the brewer, said timer including a movable control member for continuously variably setting the current supply time and a scale having marks indicative of the quantity of hot-water to be suppled in correspondence to the current supply time set by the control member, said scale marks being spaced from one another in the setting movement direction of the control member and each having a predetermined width in the setting movement direction, each of said marks including a plurality of compensating indexes indicative of the adjustment of said control member necessary to compensate the set current supply time and thus the quantity of hot water to be supplied indicated by each mark for variations in cold water conditions influencing the time required for supplying a desired quantity of hot water to the brewer.

2. The improvement according to claim 1, wherein said cold water conditions are influenced by the ambient temperature.

3. The improvement according to claim 1, wherein said compensating indexes of each mark include a high-temperature index, a standard index, and a low-temperature index arranged successively at regular intervals across the width of the mark in the direction of setting movement of said control member.

4. The improvement according to claim 1, wherein each of said marks bears a numeral indicative of the number of cups corresponding to the quantity of hot-water to be supplied at the setting of the control member to the mark.

5. The improvement according to claim 1, wherein said control member is rotatable, and said scale is in the form of a ring disposed around the control member to be coaxial with the rotational axis of the control member.

6. The improvement according to claim 1, wherein said control member is disposed to be movable in a straight line, and said scale extends in a straight line parallel to the moving direction of the control member.

7. The improvement according to claim 1, which further comprises a water-pressure switch arranged in circuit with said heating means and in the guide means between the water reservoir and the heating means and adapted to be closed by the pressure of the water in the reservoir to allow the heating means to be energized when the water is present in the reservoir.

* * * * *